United States Patent
Ponnathpur et al.

(10) Patent No.: US 10,801,385 B2
(45) Date of Patent: Oct. 13, 2020

(54) REDUCTANT DOSING CORRECTION DURING NO DOSING PERIODS

(71) Applicant: Cummins Emission Solutions Inc., Columbus, IN (US)

(72) Inventors: Chetan Ponnathpur, Columbus, IN (US); Sarang S. Sonawane, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 199 days.

(21) Appl. No.: 15/184,584

(22) Filed: Jun. 16, 2016

(65) Prior Publication Data

US 2016/0369677 A1 Dec. 22, 2016

Related U.S. Application Data

(60) Provisional application No. 62/181,597, filed on Jun. 18, 2015.

(51) Int. Cl.
*F01N 3/20* (2006.01)
*F01N 11/00* (2006.01)
*B01D 53/94* (2006.01)
*B01D 53/90* (2006.01)

(52) U.S. Cl.
CPC ......... *F01N 3/208* (2013.01); *B01D 53/9495* (2013.01); *B01D 53/90* (2013.01);
(Continued)

(58) Field of Classification Search
CPC .......... B01D 53/9495; B01D 2251/206; B01D 2258/012; B01D 53/90; B01D 53/9418;
(Continued)

(56) References Cited

U.S. PATENT DOCUMENTS

| 6,119,448 | A  | * | 9/2000  | Emmerling | B01D 53/90 |
|           |    |   |         |           | 60/274     |
| 9,644,521 | B2 | * | 5/2017  | Hegemann  | F01N 11/007 |
| 2005/0188696 | A1 | * | 9/2005  | Herz   | F02B 37/007 |
|           |    |   |         |           | 60/612     |
| 2009/0266059 | A1 | * | 10/2009 | Kesse  | F01N 3/208 |
|           |    |   |         |           | 60/295     |

(Continued)

FOREIGN PATENT DOCUMENTS

CN 102297007 A 12/2011

OTHER PUBLICATIONS

Chinese Office Action issued on Chinese Application No. 201610417319.3 dated Oct. 28, 2019.

*Primary Examiner* — Matthew T Largi
(74) *Attorney, Agent, or Firm* — Foley & Lardner LLP

(57) ABSTRACT

A system may include a $NO_x$ sensor and a controller. The controller may be configured to interpret a value of a first parameter indicative of an amount of $NO_x$ measured by the $NO_x$ sensor and interpret a value of a second parameter for a $NO_x$ value from a look-up table. The controller may be further configured to determine a correction factor based on the value of the first parameter and the value of the second parameter and generate a dosing command based, at least in part, on the determined correction factor. In some implementations, the $NO_x$ value from the look-up table may be based on one or more operating conditions of an engine. In some implementations, the controller may be further configured to update a $NO_x$ value of the look-up table based on the determined correction factor.

19 Claims, 4 Drawing Sheets

(52) U.S. Cl.
CPC .... *B01D 53/9418* (2013.01); *B01D 2251/206* (2013.01); *B01D 2258/012* (2013.01); *F01N 2560/026* (2013.01); *F01N 2610/02* (2013.01); *F01N 2900/0402* (2013.01); *F01N 2900/0412* (2013.01); *F01N 2900/08* (2013.01); *F01N 2900/1402* (2013.01); *Y02T 10/24* (2013.01)

(58) Field of Classification Search
CPC .............. F01N 3/208; F01N 2560/026; F01N 2610/02; F01N 2900/0402; F01N 2900/0412; F01N 2900/08; F01N 2900/1402; Y02T 10/24
See application file for complete search history.

(56) References Cited

U.S. PATENT DOCUMENTS

| | | | | |
|---|---|---|---|---|
| 2009/0272099 | A1* | 11/2009 | Garimella | ............... F01N 3/208 60/277 |
| 2010/0024393 | A1* | 2/2010 | Chi | ......................... F01N 3/106 60/276 |
| 2010/0101213 | A1* | 4/2010 | Tuomivaara | .......... F01N 3/0231 60/276 |
| 2010/0107610 | A1* | 5/2010 | Schussler | ................ F01N 3/106 60/287 |
| 2010/0223907 | A1* | 9/2010 | Walde | .................... F01N 3/2066 60/274 |
| 2011/0219747 | A1* | 9/2011 | Geveci | .................... F01N 3/208 60/274 |
| 2011/0320132 | A1 | 12/2011 | Zanetti et al. | |
| 2013/0031892 | A1* | 2/2013 | Nagaoka | ............ B01D 53/9477 60/274 |

* cited by examiner

US 10,801,385 B2

REDUCTANT DOSING CORRECTION DURING NO DOSING PERIODS

CROSS REFERENCE TO RELATED APPLICATIONS

The present application claims the benefit of priority to U.S. Provisional Patent Application No. 62/181,597, filed Jun. 18, 2015 and the contents of which are incorporated herein by reference in its entirety.

TECHNICAL FIELD

The present application relates generally to the field of selective catalytic reduction (SCR) systems for an exhaust aftertreatment system.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

In some instances, an engine-out $NO_x$ value may be determined based on a look-up table of values that may be retrieved based on engine conditions, such as speed (e.g., RPM), torque, fueling, etc. The engine-out $NO_x$ value may be used to determine an amount of reductant to dose into the SCR system.

SUMMARY

Various embodiments relate to determining correction factors for $NO_x$ values of a look-up table based on an actual measured $NO_x$ values from the $NO_x$ sensor, such as an outlet $NO_x$ sensor, during a no-dosing period and the $NO_x$ values of the look-up table. The correction factor is used to update the $NO_x$ values of the look-up table and/or by a reductant dosing control module to output a corrected dosing command to a dosing module of an aftertreatment system.

One embodiment of the relates to a system that includes a $NO_x$ sensor and a controller. The controller is configured to interpret a value of a first parameter indicative of an amount of $NO_x$ measured by the $NO_x$ sensor and interpret a value of a second parameter for a $NO_x$ value from a look-up table. The controller is further configured to determine a correction factor based on the value of the first parameter and the value of the second parameter and generate a dosing command based, at least in part, on the determined correction factor.

Another embodiment relates to a system that includes a $NO_x$ sensor and a controller. The controller is configured to interpret a plurality of values of a first parameter indicative of amounts of $NO_x$ measured by the $NO_x$ sensor and interpret a plurality of values of a second parameter for $NO_x$ values from a look-up table. The controller is further configured to determine a plurality of correction factors based on the plurality of values of the first parameter and the plurality of values of the second parameter and generate a dosing command based, at least in part, on a correction factor of the determined plurality of correction factors.

Yet a further embodiment relates to a method that includes determining a no-dosing period for an aftertreatment system. The method includes interpreting a plurality of values of a first parameter indicative of amounts of $NO_x$ measured by the $NO_x$ sensor for a plurality of operating conditions responsive to determining the no-dosing period. The method also includes interpreting a plurality of values of a second parameter for $NO_x$ values from a look-up table for the plurality of operating conditions of an engine. The method further includes determining a plurality of correction factors based on the plurality of values of the first parameter and the plurality of values of the second parameter. The method includes generating a correction factor curve based, at least in part, on the determined plurality of correction factors and generating a dosing command based on a value from the correction factor curve. The method further includes transmitting the generated dosing command to a dosing module of the aftertreatment system to control dosing of reductant from the dosing module.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
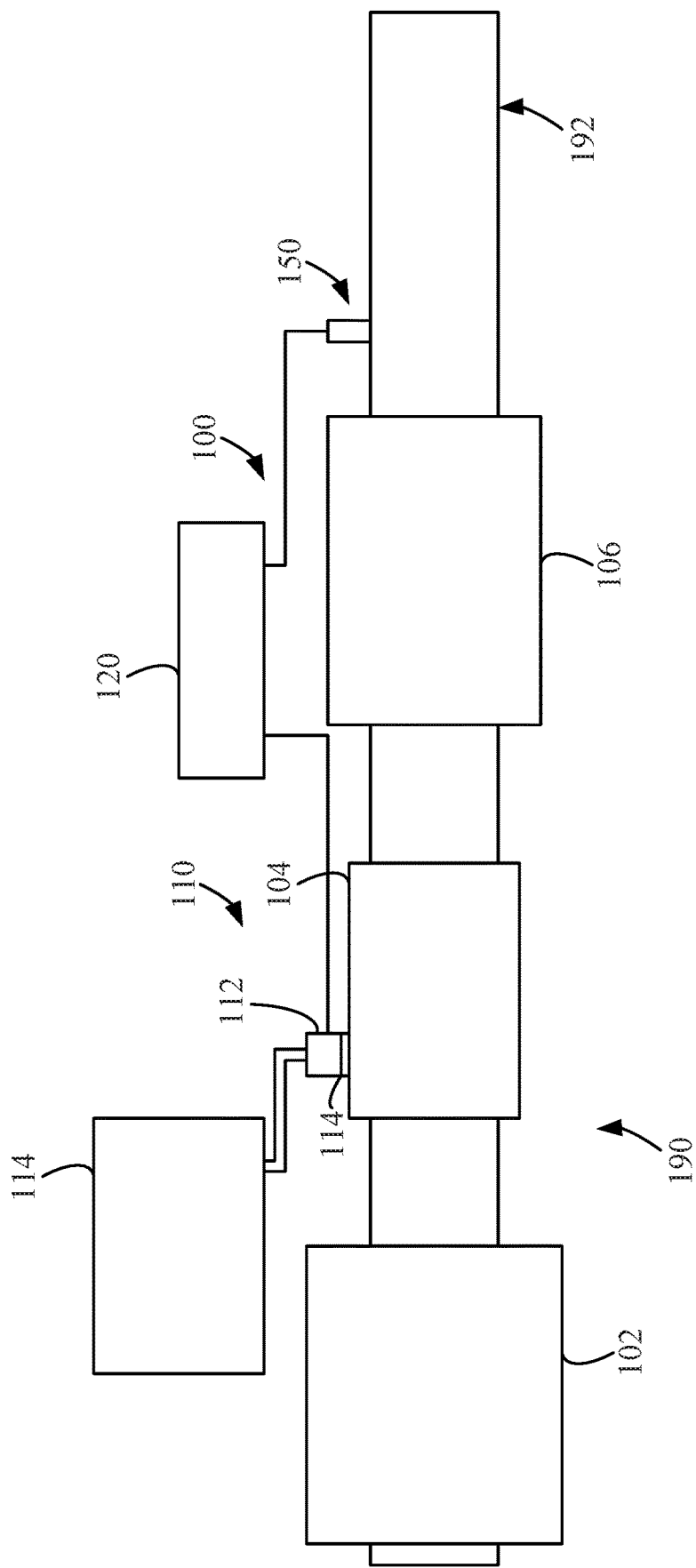
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant dosing correction. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some vehicles, $NO_x$ may be produced with other compounds as a result of combustion, such as for a diesel fuel vehicle, a diesel fuel power generator, etc. In some systems, the $NO_x$ produced by an engine may be determined based on a look-up table of values that may be retrieved based on engine conditions, such as speed (e.g., RPM), torque, fueling, etc. The engine-out $NO_x$ value may be used to determine an amount of reductant to dose into the SCR system. In some instances, the actual $NO_x$ amount emitted from the engine and the $NO_x$ value determined from the look-up table may differ. That is, the actual $NO_x$ amount emitted from the engine may differ due to engine wear, changes to system components, changes to fuel composition, etc. As a result, the dosed reductant amount based on the $NO_x$ value from the look-up table may be greater or less than the amount needed to reduce the actual $NO_x$ emitted from the engine. Accordingly, excess $NO_x$ or excess ammonia may be emitted from the exhaust system based on the deviation. Accordingly, it may be useful to correct for such deviations by determining a difference between the $NO_x$ value from the look-up table and the actual $NO_x$ emitted from the engine.

Systems may utilize the engine-out $NO_x$ determined based on values from a look-up table to reduce the cost of and/or the space needed by the exhaust system by eliminating an engine-out $NO_x$ sensor. Such systems may still include a downstream $NO_x$ sensor that is downstream of a SCR catalyst to measure the actual $NO_x$ being emitted by the system. The downstream $NO_x$ sensor may generally be used to trigger a warning of high $NO_x$ emissions, trigger regeneration of one or more components of the exhaust system, and/or other purposes during the operation of the engine.

Such a $NO_x$ sensor may be used during no-dosing periods to recalibrate or correct for variations in the actual measured $NO_x$ value from the $NO_x$ sensor when compared to the $NO_x$ value determined from the look-up table. When a no-dosing period occurs, such as during the initial start-up of the engine, the actual measured $NO_x$ value from the $NO_x$ sensor should be substantially equal to the engine-out $NO_x$. Thus, if the $NO_x$ value determined from the look-up table differs from the actual measured $NO_x$ value from the $NO_x$ sensor during the no-dosing period, a correction factor can be determined based on the actual measured $NO_x$ value from the $NO_x$ sensor and the $NO_x$ value determined from the look-up table. For instance, the correction factor may be the actual measured $NO_x$ value from the $NO_x$ sensor divided by the $NO_x$ value determined from the look-up table (e.g., $NO_{x\_}$Sensor/$NO_{x\_}$Table). In other instances, the correction factor may be based on a percentage deviation (e.g., |$NO_{x\_}$Sensor-$NO_{x\_}$Table|/$NO_{x\_}$Table).

The correction factor may be stored, such as in a memory of a controller, and/or the correction factor may be utilized to update one or more values of the look-up table. For instance, the correction factor for a specific engine condition (e.g., engine speed, torque, and/or fueling combination) may be stored and used to correct the $NO_x$ value from the look-up table when the engine conditions match the correction factor engine conditions. In other implementations, the correction factor may be applied to a range of engine conditions (e.g., a first correction factor for 0-500 RPM, a second correction factor for 501-1000 RPM, etc.). In still further implementations, the correction factor may be applied to all $NO_x$ values from the look-up table for all engine conditions.

In still other implementations, several correction factors may be determined for several different operational conditions of the engine by using several actual measured $NO_x$ values from the $NO_x$ sensor and several $NO_x$ values determined from the look-up table (e.g., a first correction factor can be determined when the engine is operating at 500 RPM, a second correction factor can be determined when the engine is operating at 1000 RPM, etc.). The correction factors may be applied to a range of engine conditions (e.g., the first correction factor for engine speeds of 0-750 RPM, the second correction factor for engine speeds 751-1250 RPM, etc.). In some implementations, a linear or other curve fit may be performed for the correction factors to generate a correction factor equation to determine correction factors for operating conditions other than the correction factors determined based on the sampled several actual measured $NO_x$ values from the $NO_x$ sensor and the several $NO_x$ values determined from the look-up table.

In some implementations, the $NO_x$ values of the look-up table may be updated based on the correction factors without separately storing the one or more correction factors. In some instances, a threshold deviation value may be utilized to trigger the storing of the one or more correction factors and/or to update the $NO_x$ values of the look-up table only if the one or more correction factors exceed the threshold deviation. For instance, if a correction factor is determined to be below a 5% threshold deviation, then the correction factor may not be stored and/or the $NO_x$ values of the look-up table may not be updated. Thus, the storage of the correction factor and/or updating of the $NO_x$ values of the look-up table may occur only once the threshold deviation value is met and/or exceeded.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump (not shown) may be used to pressurize the reductant source 116 for delivery to the dosing module 112.

The dosing module 112 is also electrically or communicatively coupled to a controller 120. The controller 120 is configured to control the dosing module 112 to dose reductant into the decomposition chamber 104. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

In certain implementations, the controller 120 is structured to perform certain operations, such as those described herein in relation to FIGS. 3-6. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to functionally execute the operations of the controller 120. In certain implementations, the controller 120 may include a $NO_x$ value correction module for performing the operations described in reference to FIGS. 3-6. The description herein including modules emphasizes the structural independence of the aspects of the controller 120 and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 3-6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant is received and an outlet in fluid communication with an end 192 of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. $NO_x$ Value Correction

Figure 2:
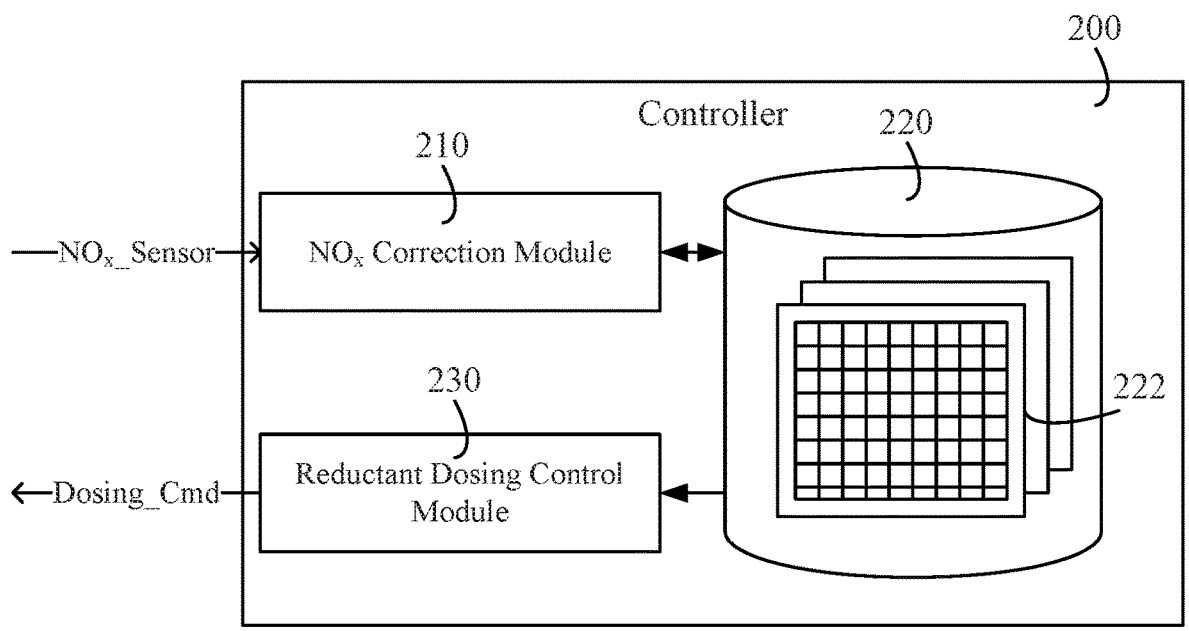
FIG. 2 is a block diagram of an example controller having a $NO_x$ correction module, a data storage, and a reductant dosing control module.

FIG. 2 depicts an implementation of a controller 200, such as controller 120 of FIG. 1, having a $NO_x$ correction module 210, a data storage 220, and a reductant dosing control module 230. The $NO_x$ correction module 210 is configured to interpret a parameter indicative of a value representative of a $NO_x$ amount measured by a $NO_x$ sensor, such as sensor 150 of FIG. 1, which may be an outlet $NO_x$ sensor. The $NO_x$ correction module 210 can also interpret a parameter indicative of a $NO_x$ value of a look-up table, such as one or more look-up tables 222 stored in data storage 220. As will be described in greater detail below in reference to FIGS. 3-6, the $NO_x$ correction module 210 can determine one or more correction factors based on the value representative of the $NO_x$ amount measured by a $NO_x$ sensor and the $NO_x$ value of a look-up table 222. In some implementations, the $NO_x$ correction module 210 can determine several correction factors for several different engine operating conditions. In some other implementations, the $NO_x$ correction module 210 may determine a correction factor curve via a curve fit to several correction factors at different operating conditions. The $NO_x$ correction module 210 may also be configured to store the correction factor(s) and/or the correction factor curve in the data storage for subsequent use, such as to correct dosing amounts during dosing events. In other instances, the $NO_x$ correction module 210 may be configured to update one or more $NO_x$ values of the look-up table 222 based on the correction factor(s) and/or the correction factor curve. In some implementations, the $NO_x$ correction module 210 may receive engine operating conditions, such as engine speed, engine torque, fueling information, atmospheric conditions, etc. to be used to determine which $NO_x$ value of a look-up table 222 to be used.

The data storage 220 may be a memory of the controller 200. The memory may include a memory chip, Electrically Erasable Programmable Read-Only Memory (EEPROM), erasable programmable read only memory (EPROM), flash memory, or any other suitable memory from which data may be written and read from. In some implementations, the data storage 220 may be part of the controller 200 or the data storage 220 may be separate from the controller 200.

The reductant dosing control module 230 is configured to output a dosing command to a dosing module, such as dosing module 112 of FIG. 1. The reductant dosing control module 230 may be configured to interpret one or more $NO_x$ values of a look-up table 222 to determine the dosing command. The reductant dosing control module 230 may receive engine operating conditions, such as engine speed, engine torque, fueling information, atmospheric conditions, etc. to be used to determine which $NO_x$ value of a look-up table 222 to be used. If the correction factor(s) and/or correction factor curve is separately stored, the reductant dosing control module 230 may also be configured to access the stored correction factor(s) and/or correction factor curve to modify one or more $NO_x$ values of a look-up table 222.

Figure 3:
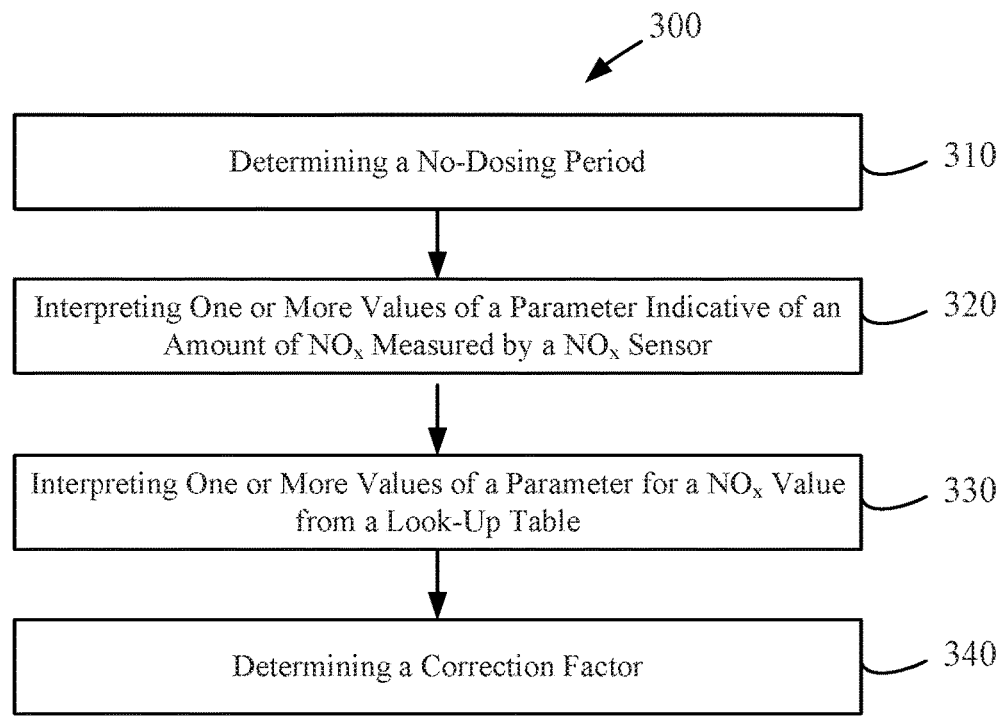
FIG. 3 is a block diagram of an implementation of an exemplary process for determining a correction factor for a $NO_x$ value of a look-up table.

FIG. 3 is a block diagram representing an implementation of an exemplary process 300 for determining a correction factor for a $NO_x$ value of a look-up table. The process 300 may be performed by the controller 120 of FIG. 1, the $NO_x$ correction module 210 of the controller 200 of FIG. 2, or another controller or module.

The process 300 includes determining that a no-dosing period is occurring (block 310). A no-dosing period is a period of time when no dosing is to be performed by the dosing module. In some instances, the no-dosing period may occur when the engine is initially started such that no reductant is stored in the SCR catalyst such that the amount of $NO_x$ output from the engine is substantially the same as the $NO_x$ measured by a $NO_x$ sensor, such as sensor 150 of FIG. 1, that is downstream of an SCR catalyst. In other instances, a no-dosing period may occur when temperature and/or flow conditions inhibit dosing from occurring.

If a no-dosing period is determined, then the process 300 interprets one or more values of a parameter indicative of an amount of $NO_x$ measured by a $NO_x$ sensor (block 320). The $NO_x$ sensor may be any suitable sensor configured to detect and output a value indicative an amount of $NO_x$ measured by the $NO_x$ sensor. The outputted value may be received by a controller, such as controllers 120, 200, and/or a module of the controller, such as $NO_x$ correction module 210, converted to a digital value, and associated with a parameter, such as $NO_x$_Sensor.

The process 300 also interprets one or more values of a parameter for a $NO_x$ value from a look-up table (block 330). A controller, such as controllers 120, 200, and/or a module of the controller, such as $NO_x$ correction module 210, can access or read a data value from a data storage, such as data storage 220, corresponding to a $NO_x$ value from a look-up table. In some implementations, engine operating conditions, such as engine speed, engine torque, fueling information, atmospheric conditions, etc. may be used to determine which $NO_x$ value of a look-up table 222 is to be used.

The process 300 includes determining a correction factor (block 340). If the $NO_x$ value from the look-up table differs from the actual measured $NO_x$ value from the $NO_x$ sensor during the no-dosing period, a correction factor can be determined based on the actual measured $NO_x$ value from the $NO_x$ sensor and the $NO_x$ value determined from the look-up table. For instance, the correction factor may be the actual measured $NO_x$ value from the $NO_x$ sensor divided by the $NO_x$ value determined from the look-up table (e.g., $NO_x$_Sensor/$NO_x$_Table). In other instances, the correction factor may be based on a percentage deviation (e.g., |$NO_x$_Sensor-$NO_x$_Table|/$NO_x$_Table). In some implementations, the correction factor may be stored, such as in a data table of a data storage. In other implementations, the correction factor may be used to update the $NO_x$ value of the look-up table, such as by replacing the old $NO_x$ value with a corrected $NO_x$ value.

In some implementations, the correction factor may be compared to a threshold value, such as 5%, 10%, etc., such that the correction factor may not be used if it is below the threshold value. Thus, for minor variations, the correction factor is not utilized.

Figure 4:
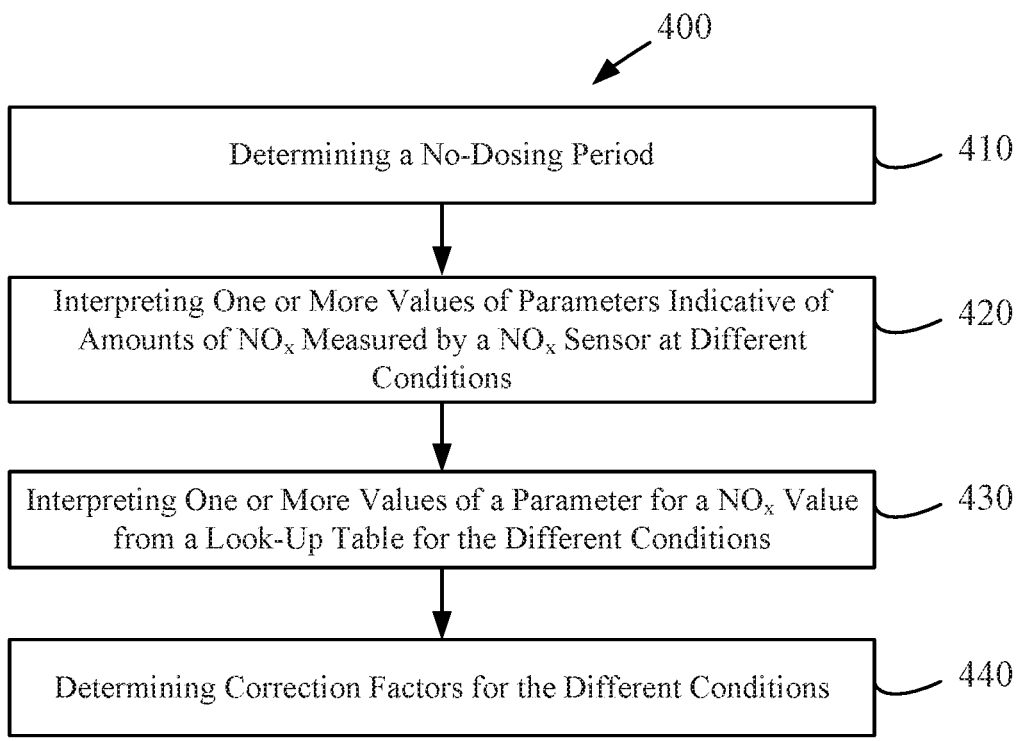
FIG. 4 is a block diagram of another implementation of a process for determining several correction factors for several $NO_x$ values of a look-up table.

FIG. 4 is a block diagram representing another implementation of a process 400 for determining several correction factors for $NO_x$ values of a look-up table for different engine operating conditions. The process 400 may be performed by the controller 120 of FIG. 1, the $NO_x$ correction module 210 of the controller 200 of FIG. 2, or another controller or module.

The process 400 includes determining that a no-dosing period is occurring (block 410). The determination of the no-dosing period may be substantially the same as the determination of the no-dosing period (block 310) of process 300.

If a no-dosing period is determined, then the process 400 interprets one or more values of parameters indicative of amounts of $NO_x$ measured by a $NO_x$ sensor, such as an outlet $NO_x$ sensor, at different conditions (block 420). The process 400 may include commands for an engine to operate at different engine speeds, different engine torques, and/or at different fueling conditions. For instance, a sequence may operate the engine at engine speeds of 500 RPM, 1000 RPM, 1500 RPM, 2000 RPM, 2500 RPM, etc. to measure the $NO_x$ at each engine speed. Thus, the amounts of $NO_x$ measured by a $NO_x$ sensor for the different conditions may be received by a controller, such as controllers 120, 200, and/or a module of the controller, such as $NO_x$ correction module 210, and may, in some instances, be stored in a table with the corresponding engine conditions.

The process 400 also interprets one or more values of parameters for $NO_x$ values from a look-up table for the different conditions (block 430). A controller, such as controllers 120, 200, and/or a module of the controller, such as $NO_x$ correction module 210, can access or read data values from a data storage, such as data storage 220, corresponding to a $NO_x$ value from a look-up table for each of the different conditions at which amounts of $NO_x$ were measured by the $NO_x$ sensor.

The process 400 includes determining correction factors (block 440). If a $NO_x$ value from the look-up table differs from an actual measured $NO_x$ value from the $NO_x$ sensor during the no-dosing period for the different operating conditions, a correction factor can be determined based on the actual measured $NO_x$ value from the $NO_x$ sensor and the $NO_x$ value determined from the look-up table based on the corresponding operating condition. For instance, the correction factor may be the actual measured $NO_x$ value from the $NO_x$ sensor divided by the $NO_x$ value determined from the look-up table (e.g., $NO_x$_Sensor/$NO_x$_Table). In other instances, the correction factor may be based on a percentage deviation (e.g., |$NO_x$_Sensor-$NO_x$_Table|/$NO_x$_Table). In some implementations, the correction factors may be stored, such as in a data table of a data storage. In other implementations, the correction factors may be used to update the $NO_x$ values of the look-up table, such as by replacing the old $NO_x$ values with corrected $NO_x$ values.

In some implementations, the correction factors may be compared to a threshold value, such as 5%, 10%, etc., such that a correction factor may not be used if it is below the threshold value. Thus, for minor variations, the correction factor is not utilized.

Figure 5:
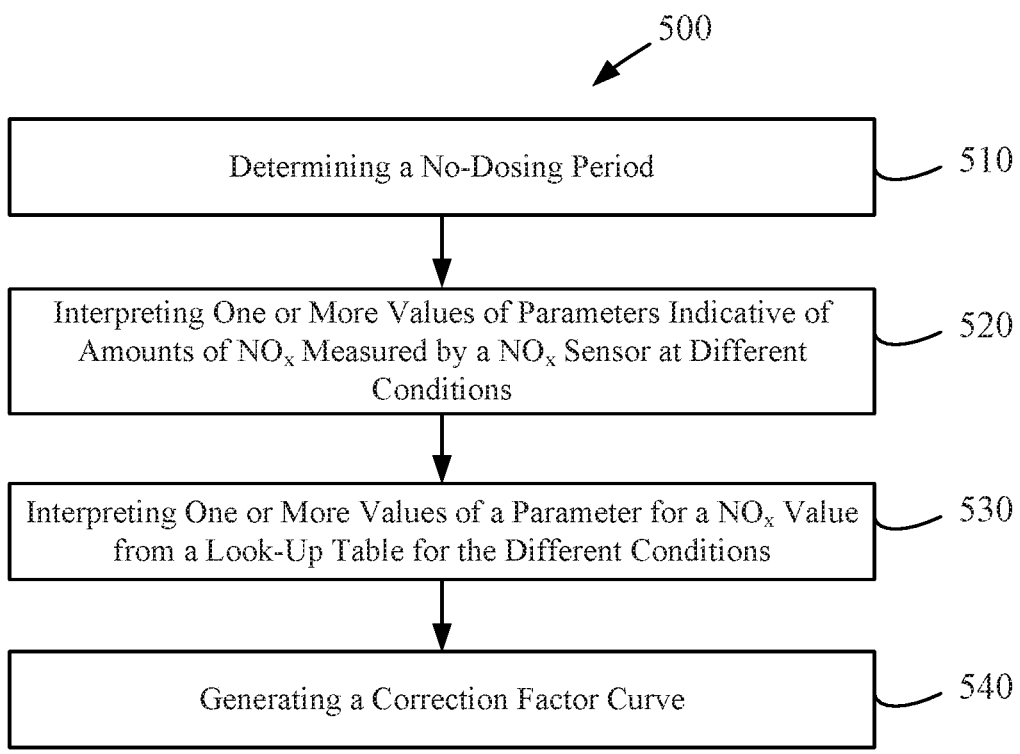
FIG. 5 is a block diagram of yet another implementation of a process for determining a correction factor curve for $NO_x$ values of a look-up table.

FIG. 5 is a block diagram representing yet another implementation of a process 500 for determining a correction factor curve based on several correction factors for $NO_x$ values of a look-up table for different engine operating conditions. The process 500 may be performed by the controller 120 of FIG. 1, the $NO_x$ correction module 210 of the controller 200 of FIG. 2, or another controller or module.

The process 500 includes determining that a no-dosing period is occurring (block 510). The determination of the no-dosing period may be substantially the same as the determination of the no-dosing period (block 310) of process 300.

If a no-dosing period is determined, then the process 500 interprets one or more values of parameters indicative of amounts of $NO_x$ measured by a $NO_x$ sensor, such as an outlet $NO_x$ sensor, at different conditions (block 520). The interpretation of one or more values of parameters indicative of amounts of $NO_x$ measured by a $NO_x$ sensor at different conditions may be substantially the same as the interpretation of one or more values of parameters indicative of amounts of $NO_x$ measured by a $NO_x$ sensor (block 420) of process 400.

The process 500 also interprets one or more values of parameters for $NO_x$ values from a look-up table for the different conditions (block 530). The interpretation of one or more values of parameters for $NO_x$ values from a look-up table for the different conditions may be substantially the same as the interpretation of one or more values of parameters for $NO_x$ values from a look-up table for the different conditions (block 430) of process 400.

The process 500 includes generating a correction factor curve (block 540). If a $NO_x$ value from the look-up table differs from an actual measured $NO_x$ value from the $NO_x$ sensor during the no-dosing period for the different operating conditions, a correction factor can be determined based on the actual measured $NO_x$ value from the $NO_x$ sensor and the $NO_x$ value determined from the look-up table based on the corresponding operating condition. For instance, the correction factor may be the actual measured $NO_x$ value from the $NO_x$ sensor divided by the $NO_x$ value determined from the look-up table (e.g., $NO_{x\_Sensor}/NO_{x\_Table}$). In other instances, the correction factor may be based on a percentage deviation (e.g., $|NO_{x\_Sensor} - NO_{x\_Table}|/NO_{x\_Table}$). A curve fit may be performed using the determined correction factors, such as via linear regression, least squares, polynomial regression, etc. The correction factor curve may be generated based on the curve fit. In some implementations, the data for the correction factor curve may be stored, such as in a data table of a data storage. In other implementations, the correction factor curve may be used to update one or more $NO_x$ values of the look-up table, such as by replacing one or more old $NO_x$ values with corrected $NO_x$ values based on the correction factor from the correction factor curve.

Figure 6:
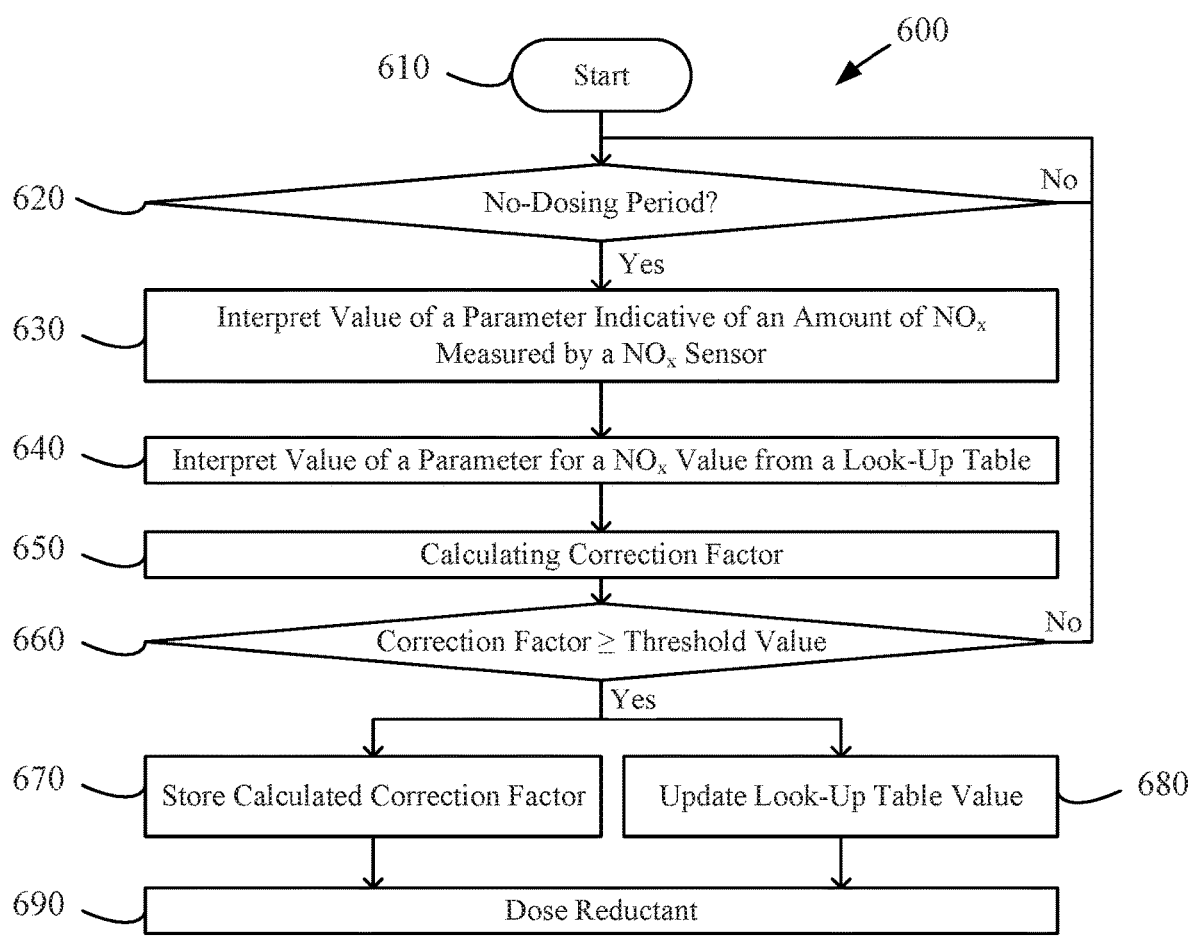
FIG. 6 is a process diagram of an implementation of an exemplary process for determining a correction factor for a $NO_x$ value of a look-up table.

FIG. 6 is a process diagram of an implementation of an exemplary process 600 for determining a correction factor and using the correction factor to dose reductant. The process 600 may be performed by the controller 120 of FIG. 1, the controller 200 of FIG. 2, including the $NO_x$ correction module 210 and the reductant dosing control module 230, or another controller or module.

The process 600 begins (block 610) and includes determining whether a no-dosing period is occurring (block 620). In some implementations, the process 600 begins (block 610) responsive to a key-on or ignition event, such as when an engine is initially started. The determination that a no-dosing period is occurring (block 620) may be based on evaluating or interpreting a flag or other parameter (e.g., a dosing command set to zero). If it is determined that the no-dosing period is not occurring, then the process 600 may loop back to determine whether a no-dosing period is occurring again, such as after a predetermined period of time and/or after the engine is restarted. In other instances, if it is determined that the no-dosing period is not occurring, the process 600 may end. If a no-dosing period is determined as occurring, then the process may continue to block 630. In some instances, the determination that a no-dosing period is occurring may be omitted if the process is initiated responsive to a key-on or ignition event.

The process 600 includes interpreting one or more values of a parameter indicative of an amount of $NO_x$ measured by a $NO_x$ sensor (block 630), such as an outlet $NO_x$ sensor. As noted above, the $NO_x$ sensor may be any suitable sensor configured to detect and output a value indicative an amount of $NO_x$ measured by the $NO_x$ sensor. The outputted value may be received by a controller, such as controllers 120, 200, and/or a module of the controller, such as $NO_x$ correction module 210, converted to a digital value, and associated with a parameter, such as $NO_{x\_Sensor}$. In some implementations, an average of the outputted values from the $NO_x$ sensor may be used.

The process 600 further includes interpreting one or more values of a parameter for a $NO_x$ value from a look-up table (block 640). A controller, such as controllers 120, 200, and/or a module of the controller, such as $NO_x$ correction module 210, can access or read a data value from a data storage, such as data storage 220, corresponding to a $NO_x$ value from a look-up table. In some implementations, engine operating conditions, such as engine speed, engine torque, fueling information, atmospheric conditions, etc. may be used to determine which $NO_x$ value of a look-up table is to be used.

The process 600 also includes calculating a correction factor (block 650). The correction factor may be calculated based on the actual measured $NO_x$ value from the $NO_x$ sensor divided by the $NO_x$ value determined from the look-up table (e.g., $NO_{x\_Sensor}/NO_{x\_Table}$). In other instances, the correction factor may be calculated based on a percentage deviation (e.g., $|NO_{x\_Sensor} - NO_{x\_Table}|/NO_{x\_Table}$).

In some implementations, the process 600 may include determining whether the calculated correction factor is equal to or greater than a threshold value (block 660). The threshold value may be a value that corresponds to a variation of 5%, 10%, 15%, etc. Thus, if the calculated correction factor is below the threshold value, then the process 600 may not correct for minor variations. In other instances, the threshold value and determination may be omitted, thereby resulting in process 600 calculating and utilizing the correction factor regardless of small variations.

If the calculated correction factor is greater than or equal to the threshold value (or the threshold value is omitted), then the process 600 may store the calculated correction factor (block 670) and/or update a look-up table value (block 680). In some implementations, the calculated correction factor may be stored in a data storage, such as data storage 220 of FIG. 2, and associated with the corresponding NO$_x$ value of the look-up table. Thus, when the NO$_x$ value from the look-up table is retrieved for dosing, then the stored correction factor may also be accessed and used to modify the NO$_x$ value from the look-up table to have the dosing module dose a corrected amount of reductant. In some instances, if the stored correction factor exceeds a threshold value, an error or warning flag can be set, such as a deviation greater than 30%, 40%, 50%, 100%, etc. from the original look-up table value. Thus, the process 600 may keep track of how much drift from the original look-up table values has occurred, which may be indicative of wear of one or more components and/or one or more component failures.

In other implementations, the calculated correction factor may be used to update the look-up table value. For instance, a new look-up table NO$_x$ value may be calculated as NO$_x$_Table=NO$_x$_Table×Correction_Factor. Thus, the look-up table may be updated as correction factors are determined, thereby keeping the look-up table up to date and minimizing the amount of data stored.

In some implementations, the calculated correction factor may be both stored and used to update the look-up table value.

The process 600 further includes dosing reductant (block 690). The stored correction factor and a corresponding NO$_x$ value from the look-up table may be accessed and used by a reductant dosing control module, such as reductant dosing control module 230 of FIG. 2, to determine a dosing command to be output to a dosing module to dose reductant. The reductant dosing control module may determine a corrected NO$_x$ value based on the NO$_x$ value from the look-up table and the stored correction factor. In other instances, the reductant dosing control module may access and use an updated NO$_x$ value from the look-up table that was updated based on the correction factor. In some instances, a stored correction factor may be used to correct NO$_x$ values from the look-up table for a range of operating conditions (e.g., a first correction factor for 0-500 RPM, a second correction factor for 501-1000 RPM, etc.). In other implementations, the correction factor may be applied to all NO$_x$ values from the look-up table for all engine conditions. In yet further implementations, if a correction factor curve is generated, then the correction factor curve may be used to determine a correction factor based on the operating conditions and the determined correction factor from the correction factor curve may be used to determine a corrected NO$_x$ value for the NO$_x$ value from the look-up table.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a $NO_x$ sensor; and
a controller configured to:
interpret a value of a first parameter indicative of an amount of $NO_x$ measured by the $NO_x$ sensor;
interpret a value of a second parameter indicative of a $NO_x$ value from a look-up table;
determine a correction factor based on the value of the first parameter and the value of the second parameter;
determine whether the determined correction factor is greater than or equal to a minimum threshold value; and
in response to the determined correction factor being greater than or equal to the minimum threshold value, update the $NO_x$ value from the look-up table based on the determined correction factor by replacing a previous $NO_x$ value with a corrected $NO_x$ value, and generate a dosing command based, at least in part, on the determined correction factor;
wherein the minimum threshold value is at least 5%.

2. The system of claim 1, wherein the $NO_x$ value from the look-up table is based on one or more operating conditions of an engine.

3. The system of claim 2, wherein the one or more operating conditions of the engine comprise an engine speed, an engine torque, or a fueling condition.

4. The system of claim 1, wherein the controller is further configured to store the determined correction factor in a data storage in response to determining that the determined correction factor is greater than or equal to the minimum threshold value.

5. The system of claim 1, wherein the controller is further configured to:
generate a correction factor curve based, at least in part, on the determined correction factor.

6. The system of claim 1, wherein the controller is further configured to:
determine a no-dosing period is occurring;
wherein the interpreting of the value of the first parameter indicative of the amount of $NO_x$ measured by the $NO_x$ sensor is in response to determining that the no-dosing period is occurring.

7. The system of claim 1, further comprising:
a dosing module;
wherein the controller is further configured to control the dosing module based on the generated dosing command.

8. The system of claim 1, wherein the controller is further configured to determine whether the determined correction factor is greater than a maximum threshold value, and in response to the determined correction factor being greater than the maximum threshold value, set a warning flag.

9. A system, comprising:
a $NO_x$ sensor; and
a controller configured to:
interpret a plurality of values of a first parameter indicative of amounts of $NO_x$ measured by the $NO_x$ sensor for a plurality of operating conditions;
interpret a plurality of values of a second parameter indicative of $NO_x$ values from a look-up table for the plurality of operating conditions;
determine a plurality of correction factors based on the plurality of values of the first parameter and the plurality of values of the second parameter;
determine whether one or more correction factors of the determined plurality of correction factors are greater than or equal to a minimum threshold value; and
in response to the one or more correction factors being greater than or equal to the minimum threshold value, update the $NO_x$ values of the look-up table based on the one or more correction factors by replacing previous $NO_x$ values with corrected $NO_x$ values, and generate a dosing command based, at least in part, on the one or more correction factors;
wherein the minimum threshold value is at least 5%.

10. The system of claim 9, wherein the plurality of operating conditions comprise one or more of a plurality of engine speeds, a plurality of engine torques, or a plurality of fueling conditions.

11. The system of claim 9, wherein the controller is further configured to:
store the one or more correction factors in a data storage in response to determining that the one or more correction factors are greater than or equal to the minimum threshold value.

12. The system of claim 9, wherein the controller is further configured to:
generate a correction factor curve based, at least in part, on the determined plurality of correction factors.

13. The system of claim 9, wherein the controller is further configured to:
determine whether a no-dosing period is occurring;
wherein the interpreting of the plurality of values of the first parameter indicative of amounts of $NO_x$ measured by the $NO_x$ sensor for the plurality of operating conditions is in response to determining that the no-dosing period is occurring.

14. The system of claim 9, wherein the one or more correction factors of the determined plurality of correction factors is associated with a range for an operating condition of the plurality of operating conditions.

15. The system of claim 14, wherein generating the dosing command comprises modifying an existing $NO_x$ value in the look-up table by the one or more correction factors associated with the range for the operating condition when an engine is operating within the range of the operating condition.

16. The system of claim 9, further comprising:
a dosing module;
wherein the controller is further configured to control the dosing module based on the generated dosing command.

17. A method comprising:
determining a no-dosing period for an aftertreatment system;
interpreting a plurality of values of a first parameter indicative of amounts of $NO_x$ measured by the $NO_x$ sensor for a plurality of operating conditions in response to determining the no-dosing period;

interpreting a plurality of values of a second parameter for $NO_x$ values from a look-up table for the plurality of operating conditions of an engine;

determining a plurality of correction factors based on the plurality of values of the first parameter and the plurality of values of the second parameter;

determining whether one or more correction factors of the determined plurality of correction factors are greater than or equal to a minimum threshold value;

in response to the one or more correction factors being greater than or equal to the minimum threshold value, updating the $NO_x$ values of the look-up table based on the one or more correction factors by replacing previous $NO_x$ values with corrected $NO_x$ values;

generating a correction factor curve based, at least in part, on the determined plurality of correction factors;

generating a dosing command based on a value from the correction factor curve; and transmitting the generated dosing command to a dosing module of the aftertreatment system to control dosing of reductant from the dosing module;

wherein the minimum threshold value is at least 5%.

18. The method of claim 17, wherein the one or more correction factors of the determined plurality of correction factors is associated with a range for an operating condition of the plurality of operating conditions.

19. The system of claim 17, wherein the plurality of operating conditions comprise one or more of a plurality of engine speeds, a plurality of engine torques, or a plurality of fueling conditions.

* * * * *